No. 664,218. Patented Dec. 18, 1900.
F. KAEFERLE.
PIPE COUPLING.
(Application filed Aug. 3, 1900.)

(No Model.)

Witnesses
Robt Aiton
Maude E. Aiton

Inventor.
Fritz Kaeferle
by Thos A. Aiton
Atty.

UNITED STATES PATENT OFFICE.

FRITZ KAEFERLE, OF HANOVER, GERMANY.

PIPE-COUPLING.

SPECIFICATION forming part of Letters Patent No. 664,218, dated December 18, 1900.

Application filed August 3, 1900. Serial No. 25,774. (No model.)

*To all whom it may concern:*

Be it known that I, FRITZ KAEFERLE, a subject of the Emperor of Germany, and a resident of Hanover, Germany, have invented a new and useful Coupling for Pipes, Tubes, &c., of which the following is a specification.

The present invention consists of a new and useful coupling for piping, tubing, &c.

Figure 3:
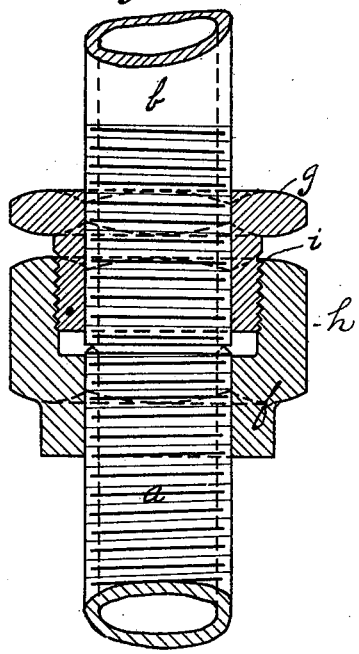
Figure 1:
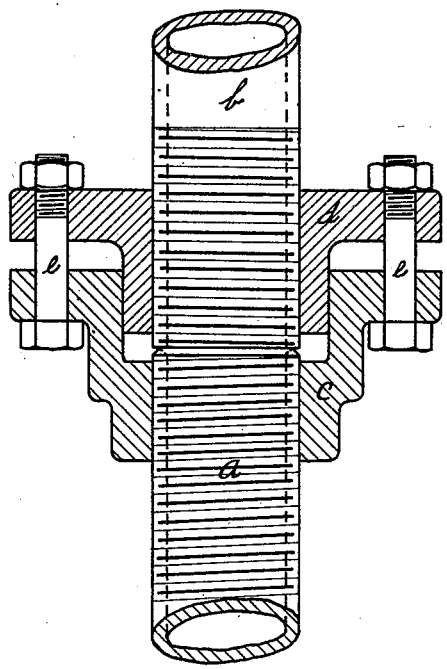
Figure 4:
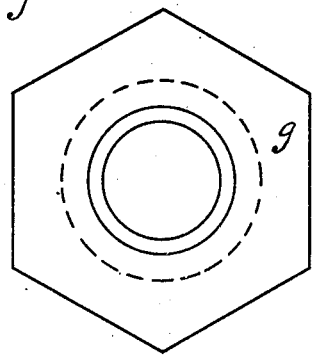
Figure 2:
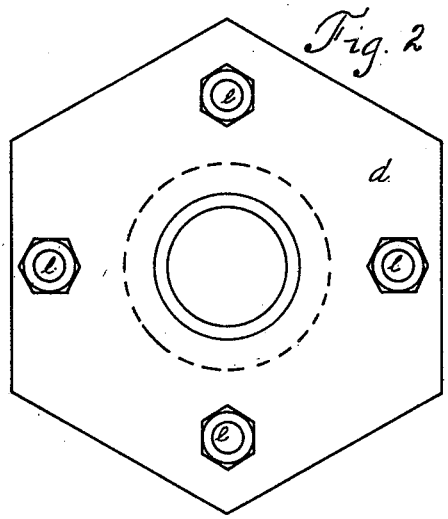

In the accompanying drawings, in which similar letters refer throughout to similar parts, Figure 1 represents in vertical section the united ends of two pipes embracing my invention. Fig. 2 is a plan view of Fig. 1. Fig. 3 is a vertical sectional view of a modification. Fig. 4 is a plan view of Fig. 3.

In making the necessary connections of pipes, tubes, &c., trouble has been experienced in joining the several ends of the pipes, &c., perfect enough to prevent leakage. Attempts have been made to eliminate this difficulty by the use of packing, soldering, &c., but have proved unsatisfactory, owing to the necessity of renewal, excessive cost, &c. It is therefore with the object in view of effecting an absolutely tight and metallic connection that the present invention has been made, the construction of which is as follows: The adjacent ends of two pipes—for example, $a$ and $b$—have formed on their outer surfaces screw-threads, the one right-handed and the other left-handed. One of the pipe ends is beveled, so that when the two are drawn tightly together it snugly rests against the joining pipe end. Mounted upon pipe $a$ and provided on its inner surface with a right-handed thread is a ring $c$, which is provided with an annular longitudinal flange $h$, forming thereby an annular chamber about the outer end of said pipe $a$. A second ring $d$ is mounted on pipe $b$ and provided on its inner surface with a left-handed thread, so that it engages that of the said pipe $b$. The body portion of ring $d$ is somewhat prolonged and is adapted to enter snugly within the annular chamber aforesaid formed by the flange $h$ of ring $c$. Said rings are provided with laterally-extending flanges in which registering openings are formed in order that locking-bolts $e$ may be slipped in for the purpose of connecting the rings $c$ and $d$, forming the coupling. However, in place of the said lateral flanges and bolts the inner surface of flange $h$ may be screw-threaded, as also the outer surface of the body portion of ring $d$, as shown in Fig. 3 at $i$. In either case, however, the lateral flanges are employed to a more or less degree and their peripheries formed like a nut-head, so that they can be easily gripped by a wrench.

It is obvious that the rings can be easily screwed on their respective pipes, the latter placed opposite each other, so that the body of ring $d\, g$ passes within the flange $h$ of ring $c\, f$, and the two rings turned together to the right or left, whence the ends of the pipes are rigidly drawn together and firmly held, so that a perfect metallic connection is effected directly between the ends of the pipes. The practicability of this coupling is self-apparent. No care or fine adjustment is necessary in order to bring the joint at any predetermined point within the coupling, as is the case where a packing is employed, inasmuch as the packing must always surround the joint, while if a necessity arises the pipes can be uncoupled by simply turning the coupling—that is, the rings $c$ and $d$—to the left or right, whence the ends of the pipes are forced apart.

Having now described my invention, what I claim as new, and desire to protect by Letters Patent, is—

1. A new and useful pipe-coupling having the adjacent ends of the pipes to be connected provided with right and left handed threads, rings adapted to engage said threaded pipe ends and one another and adapted when in such a position to be revolved together in a predetermined direction for the purpose of drawing the said ends firmly together, substantially as described.

2. A new and useful pipe-coupling having the ends of the pipes to be connected provided the one with a right-handed the other with a left-handed thread, a ring adapted to engage the said pipe with right-handed thread, an annular flange on said ring, a second ring adapted to engage the remaining pipe end and provided with a prolonged body portion adapted to enter within said flange, one of said pipe ends being beveled and adapted when the ends are brought together by revolving the said rings together to firmly enter the end of said other pipe, substantially as described.

In testimony whereof I have hereunto set my hand this 23d day of June, 1900.

FRITZ KAEFERLE.

Witnesses:
L. KASCH,
F. A. BEYER.